United States Patent
Khramov et al.

(10) Patent No.: US 11,066,591 B2
(45) Date of Patent: Jul. 20, 2021

(54) EFFECTIVE POUR POINT DEPRESSANTS FOR AMIDOAMINE EMULSIFIERS

(71) Applicant: M-I L.L.C., Houston, TX (US)

(72) Inventors: Dimitri M Khramov, Katy, TX (US); Yiyan Chen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/474,534

(22) PCT Filed: Dec. 19, 2017

(86) PCT No.: PCT/US2017/067149
§ 371 (c)(1),
(2) Date: Jun. 27, 2019

(87) PCT Pub. No.: WO2018/125651
PCT Pub. Date: Jul. 5, 2018

(65) Prior Publication Data
US 2019/0322920 A1    Oct. 24, 2019

Related U.S. Application Data

(63) Continuation of application No. 62/439,616, filed on Dec. 28, 2016.

(51) Int. Cl.
*C09K 8/36* (2006.01)
*C09K 8/34* (2006.01)

(52) U.S. Cl.
CPC . *C09K 8/36* (2013.01); *C09K 8/34* (2013.01)

(58) Field of Classification Search
None
See application file for complete search history.

(56) References Cited

U.S. PATENT DOCUMENTS 5,034,140 A * 7/1991 Gardner ............... C09K 8/74
507/244
5,851,429 A    12/1998 Magyer
7,053,127 B1    5/2006 Treybig et al.

FOREIGN PATENT DOCUMENTS

WO    2000/78891 A1    12/2000
WO    2013/095934 A2    6/2013
WO    2016/089599 A1    6/2016

OTHER PUBLICATIONS

International Search Report and Written Opinion for the equivalent International patent application PCT/US2017/067149 dated Apr. 23, 2018.
International Preliminary Report on Patentability for the equivalent International patent application PCT/US2017/067149 dated Jul. 11, 2019.

* cited by examiner

*Primary Examiner* — Jeffrey D Washville

(57) ABSTRACT

A composition comprising an oleaginous base fluid, an emulsifier and a liquid tertiary amide is disclosed. A wellbore fluid may include an oleaginous continuous phase, a non-oleaginous discontinuous phase and the composition to stabilize the non-oleaginous discontinuous phase within the oleaginous continuous phase. A method comprising adding the composition to a wellbore fluid and emplacing the wellbore fluid mixed with the composition into a wellbore is also provided.

17 Claims, 2 Drawing Sheets

EFFECTIVE POUR POINT DEPRESSANTS FOR AMIDOAMINE EMULSIFIERS

This application claims the benefit of and priority to a U.S. Provisional Application having Ser. No. 62/439,616, filed 28 Dec. 2016, which is incorporated by reference herein.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate. The drilling fluid should also form a thin, low permeability filter cake that seals openings in formations penetrated by the bit and act to reduce the unwanted influx of formation fluids from permeable rocks.

Drilling fluids are typically classified according to their base material; in oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Oil-based drilling fluids are generally used in the form of invert emulsion fluids. An invert emulsion mud may include three-phases: an oleaginous phase, a non-oleaginous phase and a finely divided particle phase. Optionally included are emulsifiers and emulsifier systems, weighting agents, fluid loss additives, alkalinity regulators and the like, for stabilizing the system as a whole and for establishing the desired performance properties.

Emulsifiers are routinely employed in the drilling business to lower the interfacial tension between oil and water which allows the formation of stable invert emulsion fluids/mud (IEF) with small drops to be formed. There have been many emulsifiers used in the drilling applications including but not limited to alkyl amine, alkyl amidoamine, and derivatives.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition that includes an oleaginous base fluid, an emulsifier and a liquid tertiary amide.

In another aspect, embodiments of the present disclosure relate to a method that includes adding a composition to a wellbore fluid, the composition comprising an oleaginous base fluid; an emulsifier; and a liquid tertiary amide; and emplacing the wellbore fluid mixed with the composition into a wellbore.

Other aspects and advantages of the claimed subject matter will be apparent from the following description and the appended claims.

DETAILED DESCRIPTION

Figure 1:
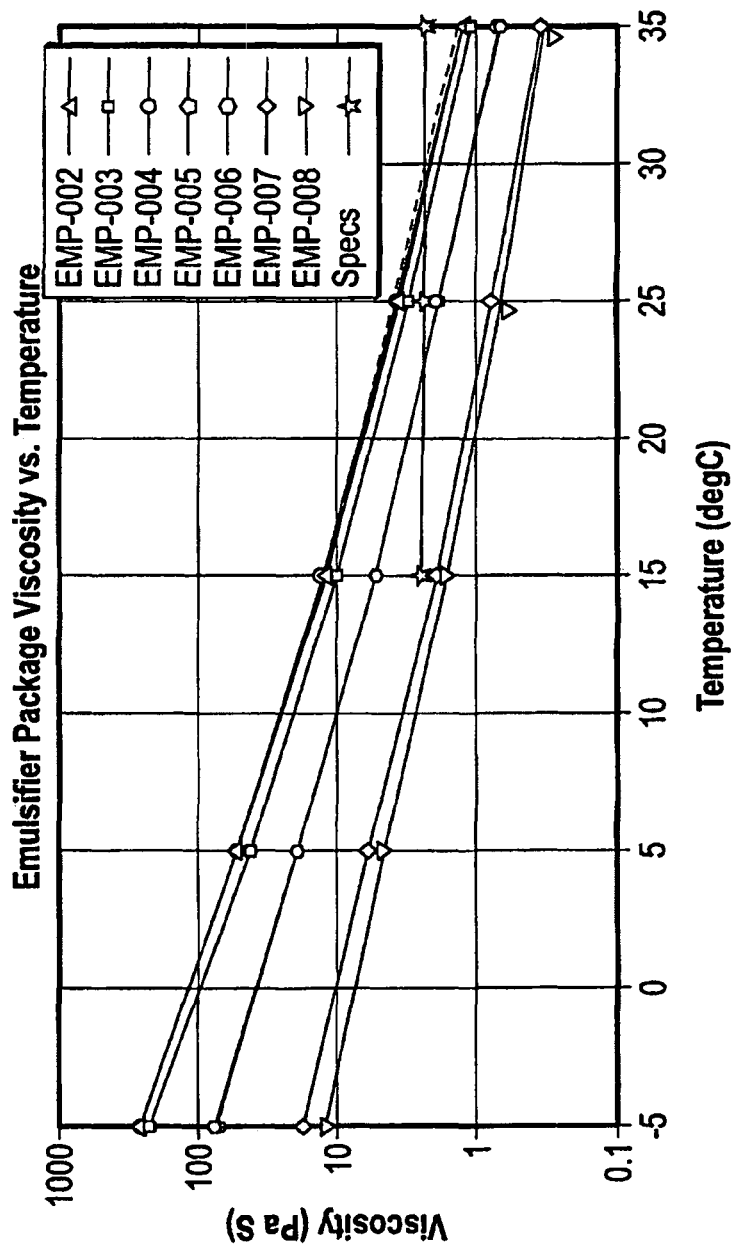
FIGS. 1 and 2 show the emulsifier package viscosity versus temperature according to embodiments of the present disclosure.

Generally, embodiments disclosed herein are directed to compositions and methods of using the same for improving invert emulsions stability, as well as to provide favorable rheological properties of high temperature oil based muds (OBM). More specifically, embodiments disclosed herein relate to emulsifier compositions formed of an oleaginous base fluid, an emulsifier and a liquid tertiary amide. The inventors of the present disclosure have found that certain amides, such as liquid tertiary amides may be incorporated as pour point depressants (PPDs) into emulsifier packages to achieve acceptably high concentration of emulsifiers and to maintain low viscosity of the emulsifier package. Such pour point depressants (PPDs) are highly effective, temperature stable and show minimal negative impact on the emulsion stability in oil-based wellbore fluids. However, it is also understood that the emulsifier package may be used for other non-downhole applications. That is, the emulsifier packages of the present disclosure may be used where the surfactant/emulsifier tends to form intra-molecular hydrogen bonding.

While emulsifiers are readily used to create invert emulsion muds, for example, emulsifier packages may present challenges in packaging due to their physical form. In order to reduce the viscosity of an emulsifier package, pour point depressants (PPDs) may be used to alleviate or prevent rheological issues. A common glycol derivative PPD, such as butylenetriglycol (BTG), has good solvency, high flash point, thermal stability, and a low chemical reactivity which lead to its popular use in packaging. However, BTG does have negative impacts on emulsion stability in oil based muds (OBM) due to its improper HLB value (Hydrophilic Lipophilic Balance). In addition, the alcohol functionality also leaves it susceptible to reaction with the emulsifier acid functionality during higher temperature or longer term storage. Some selective esters may also act as PPDs that can meet many of the required features. However, hydrolysis of esters may release small molecule volatile components which will decrease flash point of the system (bad for safety), and some of the ester and/or its decomposed product may harm the mud performances.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

An emulsifier is a kind of surfactant. Surfactants are surface active compounds, that is, they show higher activity (i.e., concentration) at the surface or interface than the bulk solution phase. Due to this property, they lower the surface tension of a liquid, the interfacial tension between two liquids, or that between a liquid and a solid. Surfactants may act as detergents, wetting agents, emulsifiers, foaming agents, and dispersants. As defined herein, an emulsifier is a type of surfactant that aids in forming of an emulsion (i.e., a mixture of two or more liquids that are normally immiscible) by decreasing the interfacial tension between immiscible liquids (e.g., oil and water), or a compound that stabilizes an already existing emulsion by decreasing the separation tendency of the liquids, or both.

Emulsifiers are pivotal to the stability of invert emulsion fluid/mud (IEF) in drilling applications. One of the most frequently used emulsifiers is represented by amidoamine chemistry. Amidoamines are highly effective in stabilizing invert emulsions and provide favorable rheological properties to an oil based mud (OBM). However, amidoamines present a challenge in packaging. Amidoamines, in their pure form, are tacky soft solids. This physical form presents a major challenge for their practical application in the lab or the field. Amidoamines may be mixed with a base oil, such as those used in OBMs, which can be diesel, mineral oil, alpha olefins, or isomerized olefins. These solvents are used because of their high flash point and compatibility with OBM. However, because of the polar nature of amine groups in amidoamine emulsifiers, amidoamines do not have very good solubility in a base oil. To achieve acceptably high concentration of an amidoamine and to maintain low viscosity of the package, a pour point depressant may be added to a mixture of amidoamine and a hydrocarbon oil.

Generally, the pour point of a fluid composition is commonly known as the lowest temperature at which the fluid composition can still flow. In this disclosure the pour point of the composition is measured by visually estimating whether the composition is flowing under certain temperature, or by viscosity measurement.

Pour point depressants, or viscosity improvers, may be added to a composition to reduce the pour point and improve the flow properties of a composition. In one or more embodiments of the present disclosure, the pour point depressant may be added to reduce the pour point of the emulsifier package being used to formulate an invert emulsion. An effective pour point depressant may exhibit the following features: 1) is a good mutual solvent that may homogenize the solutes and solvents; 2) is not flammable in order to eliminate HSE risks; 3) has low reactivity in the package storage condition; 4) does not affect the final mud performances; 5) does not damage the environmental profile of the mud. In addition, the PPD may be soluble and compatible with the base oil and may maintain an appropriate Brookfield viscosity at low temperatures.

In one aspect, embodiments disclosed herein relate generally to compositions that may be added to an emulsifier package with the purpose of achieving high concentrations of the emulsifier and to maintain a low viscosity of the package. As noted above, the emulsifier packages may be included in wellbore fluids such as for example, invert emulsions.

According to the present embodiments, the compositions of the present disclosure may contain an oleaginous base fluid, an emulsifier and a liquid tertiary amide as a PPD. The specific PPD used may be dictated by the emulsifier chemistry. For example, emulsifiers designed for high temperature applications may exhibit higher hydrogen bonding ability and may exhibit a higher polarity than common emulsifiers (such as SUREMUL®, available from M-I SWACO).

As disclosed herein, the liquid tertiary amide may serve as an effective pour point depressant (PPD) in an emulsifier package, such as an amidoamine emulsifier package. The liquid tertiary amides that have shown utility in the present disclosure may be selected from the group of cyclic or acyclic liquid tertiary amides.

According to the present embodiments, a common feature of these liquid tertiary amides is a disubstituted amide structure, i.e., amides without any hydrogen atoms attached to nitrogen, as depicted by the following chemical structure:

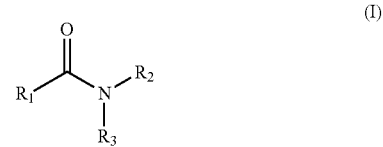

(I)

where the groups $R_1$, $R_2$ and $R_3$ may be the same or may be different.

Without being bound by the theory, the inventors of the present disclosure believe that such PPDs are effective because they are polar and have also the ability to form hydrogen bonds with the emulsifier molecules and to disrupt H-bonding of emulsifier molecules among themselves to prevent them from crystallizing. It is also envisioned that the disclosed PPDs may be added to other surfactants that tend to form intra-molecular H-bonding.

According to various embodiments, any of the $R_1$, $R_2$ and $R_3$ groups may have at least five carbon atoms in total. It is also envisioned that the group $R_1$ may have a longer hydrocarbon chain than each of the groups $R_2$ and $R_3$. In such embodiments, the groups $R_2$ and $R_3$ may be selected from smaller alkyl groups. Examples of amides as depicted by the chemical formula I may be represented by compounds where $R_1$ is a long chain and $R_2$ and $R_3$ are $CH_3$ groups. However, alkyl groups such as ethyl, propyl, etc. or even longer alkyl chains (greater than C5) are envisioned. It is also envisioned that the group $R_1$ may have a shorter hydrocarbon chain than each and/or either of the groups $R_2$ and $R_3$. In such an embodiment, the group $R_1$ may be selected from smaller alkyl groups, such as for example $CH_3$ groups or ethyl, propyl, etc. or even longer alkyl chains.

In one embodiment, $R_1$ may be selected from the group of $C_5$-$C_{16}$ saturated and unsubstituted hydrocarbon chains. In yet another embodiment, $R_1$ may be selected from the group of $C_5$-$C_{20}$ unsaturated and/or branched hydrocarbon chains. The liquid tertiary amides that have shown utility in the present disclosure may be selected from the group of N,N-dimethylamides. These amides have good solvency, have high flash points, and have low reactivity towards hydrolysis. In addition, such amides have H-bonding ability to amidoamine emulsifiers which disrupt the thickening intramolecular H-bonding between emulsifier molecules. Without being bound by the theory, the inventors of the present disclosure believe that if the amide is primary or secondary, then excessive hydrogen bonding between amide molecules occurs and they stop working as effective PPDs because their melting points become too high, as seen below in Table 1.

TABLE 1

Amide melting points versus the substitution pattern on the nitrogen atom.

| Amide | Melting Point |
|---|---|
| Decanamide | 210° F. (98.8° C.) |
| N-methyldecanamide | 156° F. (68.8° C.) |
| N,N-dimethyldecanamide | 1.4° F. (−17° C.) |

As noted above, the liquid tertiary amides of the present disclosure may also be selected from the group of cyclic tertiary amides. In such embodiments, $R_1$ and $R_2$ may be connected as shown below in structure (II). For example, the amides may be selected from the group of N-alkylpyrrolidinones, where the group $R_3$ is directly linked to the nitrogen atom belonging to the pyrrolidone group. In such an embodiment, $R_3$ may be selected from the group of alkyl groups described above (particularly $C_5$-$C_{16}$ saturated and unsubstituted hydrocarbon chains or $C_5$-$C_{20}$ unsaturated and/or branched hydrocarbon chains).

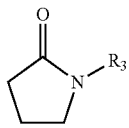

(II)

In various embodiments, the cyclic tertiary amide may be selected from the group of disubstituted amides, such as N-decanoylpiperidine or other N-alkanoylpiperidines, where groups $R_2$ and $R_3$ are connected, as shown below in structure (IV), and $R_1$ may any selected from the alkyl groups described above (particularly $C_5$-$C_{16}$ saturated and unsubstituted hydrocarbon chains or $C_5$-$C_{20}$ unsaturated and/or branched hydrocarbon chains):

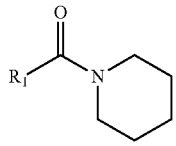

(III)

It is also envisioned that other tertiary amides such as ureas, may be used as pour point depressants. The ureas that have shown utility in the present disclosure may be selected from the group of cyclic or acyclic tetrasubstituted ureas, as represented by structures (IV) and (V) below:

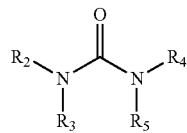

(IV)

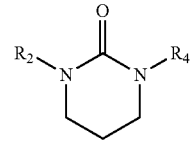

(V)

where at least one (and up to all) of $R_2$, $R_3$, $R_4$, and $R_5$ are selected from $C_5$-$C_{16}$ saturated and unsubstituted hydrocarbon chains or $C_5$-$C_{20}$ unsaturated and/or branched hydrocarbon chains. It is envisioned that one or more (but not all) of $R_2$, $R_3$, $R_4$, and $R_5$ may have lower alkyl groups (less than C5), such as methyl, ethyl, propyl, etc.

Thus, the substitution pattern on ureas may follow the general trend described above for the liquid tertiary amides. For example, according to various embodiments, the ureas may be linear, cyclic, or may have different chain lengths. In addition, just like for the liquid tertiary amides, the lack of hydrogen atom on the nitrogen atom is desired. Similar to amides (as seen in Table 1), unsubstituted ureas may have too high melting points to serve as effective PPDs.

It is also envisioned that the pour point depressants of the present disclosure may be employed alone, or they may be used, in particular embodiments, in combination with one or more additives for improving flowability and/or other properties, which are in use in the art or known from the literature. Such additives may, for example, be oxidation inhibitors, corrosion inhibitors, detergents, storage stabilizers, lubricity agents and other pour point depressants. For example, the PPDs as described herein may be combined with one or more other PPDs. Thus, these other PPDs may be any compounds known by one with skill in the art to exhibit pour point depressant properties, such as for example ethoxylated alcohols.

The amount of PPDs used in preparing an emulsifier package may vary according to various factors such as the base fluid type the degree of pour point and viscosity corrections desired, the ambient conditions, etc. According to the various embodiments, the composition of the present disclosure may contain the pour point depressant in a proportion of about 0% to about 30%, by weight, based on the weight of emulsifier, where the lower limit can be any of 0%, 5% or 10% by weight, and the upper limit can be any of 20%, 25% or 30%, where any lower limit can be used with any upper limit.

Non-limiting examples of emulsifiers that may be used in the emulsifier package disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Further, it is also understood that other emulsifiers, particularly those needing a pour point depressant to overcome challenges in packing, may be used in the emulsifier package, or for surfactants that tend to form intra-molecular hydrogen bonding.

As mentioned above, the emulsifier package (including the pour point depressant) may also include a base fluid. Such base fluid may be, for example, a diesel oil, mineral oil, a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids. Further, as mentioned above, in one or more embodiments, the emulsifier package may be added to a wellbore fluid for final use downhole. Thus, it is envisioned that the base fluid for the emulsifier package may be the same as or compatible with that used in the base fluid of the wellbore fluid formulation. In various embodiments, the wellbore fluids may be selected from the group of oil-based wellbore fluids, such as emulsions of oleaginous and non-oleaginous fluids. In particular, various embodiments of the present disclosure may provide for an invert emulsion wellbore fluid. Invert emulsion, as used herein, is an emulsion in which a non-oleaginous fluid is the discontinuous phase and an oleaginous fluid is the continuous phase. The non-oleaginous fluid (such as water) is dispersed in spherical form by violent agitation of a mixture of a non-oleaginous and an oleaginous fluid (such as an oil and water mixture) in the presence of an emulsifier.

Oleaginous base fluid, as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such as hydrocarbons and combinations of these fluids.

Non-oleaginous liquid as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

In one or more embodiments, the oleaginous continuous phase is selected from the group including diesel oil, mineral oil, a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids. Generally, the amount of the oleaginous phase may be sufficient to form a stable emulsion when utilized as the continuous phase. The amount of oleaginous phase in the invert emulsion fluid may vary depending upon the particular oleaginous phase used, the particular non-oleaginous phase used, and the particular application in which the invert emulsion fluid is to be employed. The amount of non-oleaginous phase in the invert emulsion fluid may vary depending upon the particular non-oleaginous phase used, the emulsifier selected to stabilize the non-oleaginous phase, and the particular application in which the invert emulsion fluid is to be employed. In one or more embodiments, the oil based fluid may contain up to 40, 50 or 60 vol. % water or other non-oleaginous phase, and at least 40, 50, or 60 vol. % of oleaginous phase. The amount of the non-oleaginous fluid is typically less than the theoretical limit needed for forming an invert emulsion. However, it is also understood that the emulsifier package may be used with high internal phase ratio invert emulsions having a greater than 60 vol. % non-oleaginous phase and less than 40 vol. % oleaginous phase.

In various embodiments, the non-oleaginous phase may be a brine, which may include seawater, aqueous solutions wherein the salt concentration is less than that of sea water, or aqueous solutions wherein the salt concentration is greater than that of sea water. As described later in greater detail, the seawater contains more than one dissolved salt. It is also envisioned that synthetic brines may be used in the wellbore fluids disclosed herein, the synthetic brines tending to be much simpler in constitution than the natural ones.

Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution.

Upon mixing, the fluids of the present embodiments may be used in wellbore operations, such as drilling operations. Such operations are known to persons skilled in the art and involve pumping a drilling fluid into a wellbore through an earthen formation. The wellbore fluids of the present embodiments may have particular applications for drilling operations at high temperatures as they exhibit improved emulsion stability. In addition, such IEF muds are stable, while maintaining a favorable environmental rating.

One embodiment of the present disclosure includes a method, such as a method of drilling. In such an illustrative embodiment, the method involves adding a composition to a wellbore fluid, the composition comprising an oleaginous base fluid; an emulsifier; and a liquid tertiary amide; and emplacing the wellbore fluid mixed with the composition into a wellbore.

In such embodiment, the amount of liquid tertiary amide used as a pour point depressant, as noted above, ranges from about 0% to about 30% based on the weight of final emulsifier. The emulsifier package may be added to the wellbore fluid at a percent by weight (wt %) that may range from 0.5 wt % to 18 wt % of the wellbore fluid in some embodiments, and from 1 wt % to 15 wt % in particular embodiments. However, more or less emulsifier may be added depending on the expected conditions downhole and the composition and amount of the oleaginous and aqueous phases in the wellbore fluid.

The wellbore fluids of the present disclosure may also contain wellbore fluid additives such as wetting agents, organophilic clays, viscosifiers, bridging agents, fluid loss control agents, alkalinity control agents, and corrosion inhibitors, which may be added to the compositions disclosed herein so as to impart additional functional properties.

In addition to the emulsifier provided as part of the emulsifier package, the wellbore fluid may also contain surfactants that may be characterized as wetting agents. Wetting agents that may be suitable for use in the fluids disclosed herein include crude tall oil, oxidized crude tall oil, organic phosphate esters, modified imidazolines and amidoamines, alkyl aromatic sulfates and sulfonates, dicarboxylic fatty acids, dimer acids, or dimers of fatty acids, and the like, and combinations or derivatives of these. VERSAWET™ and VERSACOAT™, NOVAMUL™, FAZEMUL™, FAZEWET™, MEGAMUL™, SUREMUL™, ONEMUL™, ACTIMUL RD™, and MUL-XT™ are examples of commercially available wetting agents manufactured and distributed by M-I L.L.C. of Houston, Tex. that may be used in the fluids disclosed herein.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Clays such as attapulgite, sepiolite, bentonite, and the like may also be used as viscosifiers. The amount of viscosifier used in the compositions may vary depending on downhole conditions, as understood by those skilled in the art. However, normally about 0.1% to 6% by weight range may be sufficient for most applications. VG-69™, VG-SUPREME™, VG-HT™, and VG-PLUS™ are organoclay available from M-I, L.L.C. (Houston, Tex.), and VERSA-HRP™ is a polyamide resin material available from M-I L.L.C. (Houston, Tex.) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSALIG™, ECOTROL™ family of products, ONETROL-HT™, EMI 789, and NOVATECH™ F, which are all commercially available from MI SWACO (Houston, Tex.).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, ilmenite, barite, siderite, celestite, dolomite, calcite, manganese oxides, halites and the like. Weighting agents in accordance with the present disclosure may include commercially available additives such as M-I WATE™ available from M-I L.L.C. (Houston, Tex.). The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

The method used in preparing wellbore fluids described herein is not critical. Conventional methods can be used to prepare the wellbore fluids in a manner analogous to those normally used, to prepare conventional oil-based drilling fluids. In one representative procedure, a desired quantity of oleaginous fluid such as a base oil and a suitable amount of the emulsifier package are mixed together and the remaining components (if necessary) are added sequentially with continuous mixing. An invert emulsion of the present disclosure is formed by vigorously agitating, mixing or shearing the oleaginous fluid and the non-oleaginous fluid.

In various embodiments, methods of drilling a subterranean hole with an invert emulsion drilling fluid may comprise mixing an oleaginous fluid, a non-oleaginous fluid, an emulsifier, such as those described above, and in the ratios described above, to form an invert emulsion; and drilling the subterranean hole using this invert emulsion as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. One skilled in the art would recognize that oil-based drilling muds may be prepared with a large variety of formulations. Specific formulations may depend on the state of drilling a well at a particular time, for example, depending on the depth and/or the composition of the formation.

EXAMPLES

The following examples are presented to further illustrate the properties of the pour point depressants as described herein.

Initially, amidoamine emulsifiers developed for high temperature OBM were diluted with Synthetic B base oil, as the emulsifiers in pure form are tacky resins. For example, upon dilution of a DETA-based amidoamine emulsifier containing 60% solids with Synthetic B base oil, the emulsifiers took on the consistency of dough (not shown). Attempts to thin the emulsifier by decreasing the percentage of solids in the package by adding more base oil resulted in oil separation with an oil puddle on top of the emulsifier that maintained approximately 60% solids concentration. However, in this form, the product is unusable in the field where it needs to be either liquid and pourable, or an easy flowing solid.

Next, a series of emulsifier formulations were prepared using different amounts of PPD. The PPD used was a common glycol derivative, such as butylenetriglycol (BTG). The pourability of the formulations was given a subjective rating. The results are summarized below in Table 2. As seen from Table 2, pourable emulsifier packages that include DETA-based amidoamine emulsifiers may be prepared using sufficiently low solids content and a high enough BTG content. From previous investigations it is known that excess PPD may destabilize the emulsion. Thus, emulsions were prepared using these formulations and afterwards they were subjected to elevated temperature to test emulsion stability. The results are presented in Table 3, below. As seen from Table 3, excess BTG is detrimental on emulsion stability. As seen from Table 3, formulation no. 3 appears to be acceptable, but the resin content is too low. A low concentration of active (resin) means that the product may take more floor space at the drill site. In addition, larger volumes of the diluted emulsifier increase transportation costs and therefore, are undesirable.

TABLE 2

Emulsifier formulations with BTG

| Formulation no. | Resin content | BTG | Pourable |
| --- | --- | --- | --- |
| 1 | 50% | 0% | No |
| 2 | 45.5 | 9.1 | No |
| 3 | 41.7 | 16.7 | Yes |
| 4 | 33.3 | 33.3 | Yes |
| 5 | 29% | 37% | Yes |

TABLE 3

Emulsion stability versus temperature at various BTG levels.
Formulation no. 5 is not shown.

| | Formulation 1 Not pourable | Formulation 2 Not pourable | Formulation 3 | Formulation 4 |
|---|---|---|---|---|
| After shearing 5 minutes/6000 rpm, sitting 30 minutes at room temperature | Minimum amount of liquid separated. | Minimum amount of liquid separated. | No separation. | Substantial amount of water separated. |
| After hot rolling at 350° F. (176.6° C.) for 3.5 hrs and cooling/sitting for 50 minutes | Substantial amount of liquid separated. | Substantial amount of liquid separated. | No separation. | Substantial amount of water separated. |

Selective formulations shown in Table 2 appear to make acceptable muds without apparent issues, as shown in Table 4. For formulations 2 and 3, the ratios 1:5 and 1:2.5, respectively, represent the ratio of emulsifier resin to PPD. However, a detrimental effect of BTG can be observed in formulation no. 5 in Table 4. As seen in Table 4, a high enough BTG content is highly detrimental to mud performances. It is possible that low enough BTG content is not an issue, but it may become an issue due to a synergistic effect of BTG and impurities known to destabilize emulsions (such as NaCl, cement spacer, extended exposure to time and temperature). For these reasons, BTG is not the most desirable PPD for an emulsifier designed for use in high temperature OBMs.

TABLE 4

OBM performance details using emulsifier package with BTG described in Table 2. The rheology was studied at 40° F. (4.4° C.), 100° F. (37.8° C.) and 150° F. (65.5° C.)

| Product | 350° F. (176.6° C.) Experiment Formulation 5 | 350° F. (176.7° C.) Experiment Formulation 1 |
|---|---|---|
| | | No BTG |
| Synthetic B | 152 | 152 |
| Versagel HT, g | 2 | 2 |
| Lime, g | 5 | 5 |
| Emulsifier, g | 12.5 | 12.5 |
| SUREWET ®, g | 1 | 1 |
| FLA, g | 3 | 3 |
| 25% CaCl$_2$ brine, g | 65 | 65 |
| M-I WATE, g | 410 | 410 |

| | 150° F. | 40° F. | 100° F. | 150° F. | 150° F. | 40° F. | 100° F. | 150° F. |
|---|---|---|---|---|---|---|---|---|
| 600 rpm | 45 | 149 | 68 | 50 | | 166 | 82 | 56 |
| 300 rpm | 21 | 83 | 35 | 27 | | 93 | 46 | 30 |
| 200 rpm | 15 | 59 | 25 | 19 | | 67 | 34 | 22 |
| 100 rpm | 8 | 33 | 14 | 11 | | 40 | 21 | 15 |
| 6 rpm | 1 | 5 | 2 | 2 | | 6 | 5 | 5 |
| 3 rpm | 1 | 4 | 2 | 2 | | 5 | 4 | 5 |
| PV | 24 | 66 | 33 | 23 | 0 | 73 | 36 | 26 |
| YP | −3 | 17 | 2 | 4 | 0 | 20 | 10 | 4 |
| 10"gels | 1 | 4 | 2 | 2 | | 7 | 7 | 9 |
| 10' gels | 1 | 22 | 4 | 3 | | 13 | 17 | 13 |
| ES | | | | | 179 | | | 391 |
| HTHP at 350° F. (176.7° C.) | | | | | 24 | | | 7 |
| Water | | | | | 3 | | | trace |
| VSST at 150° F. (65.5° C.), dif. | | | | | | | | 3.12 |

TABLE 4-continued

OBM performance details using emulsifier package with BTG described in Table 2. The rheology was studied at 40° F. (4.4° C.), 100° F. (37.8° C.) and 150° F. (65.5° C.)

| Product | 351° F. (177° C.) Experiment Formulation 2 | | | | 352° F. (177.8° C.) Experiment Formulation 3 | | | |
|---|---|---|---|---|---|---|---|---|
| | 1:5 | | | | 1:2.5 | | | |
| Synthetic B | 152 | | | | 152 | | | |
| Versagel HT, g | 2 | | | | 2 | | | |
| Lime, g | 5 | | | | 5 | | | |
| Emulsifier, g | 13.75 | | | | 15 | | | |
| SUREWET ®, g | 1 | | | | 1 | | | |
| FLA, g | 3 | | | | 3 | | | |
| 25% CaCl₂ brine, g | 65 | | | | 65 | | | |
| M-I WATE, g | 410 | | | | 410 | | | |
| | 150° F. | 40° F. | 100° F. | 150° F. | 150° F. | 40° F. | 100° F. | 150° F. |
| 600 rpm | | 164 | 76 | 55 | | 170 | 73 | 53 |
| 300 rpm | | 91 | 42 | 31 | | 99 | 39 | 28 |
| 200 rpm | | 66 | 31 | 24 | | 71 | 28 | 21 |
| 100 rpm | | 40 | 20 | 16 | | 43 | 17 | 14 |
| 6 rpm | | 8 | 7 | 7 | | 10 | 6 | 6 |
| 3 rpm | | 6 | 6 | 7 | | 8 | 5 | 6 |
| PV | 0 | 73 | 34 | 24 | 0 | 71 | 34 | 25 |
| YP | 0 | 18 | 8 | 7 | 0 | 28 | 5 | 3 |
| 10"gels | | 10 | 10 | 11 | | 13 | 10 | 10 |
| 10' gels | | 29 | 15 | 14 | | 27 | 15 | 14 |
| ES | | | | 543 | | | | 413 |
| HTHP at 350° F. (176.7° C.) Water | | | | 6.4 trace | | | | 6.2 trace |
| VSST at 150° F. (65.5° C.), dif. | | | | 3.1 | | | | 3.52 |

The search for other compounds capable of dissolving amidoamines indicates that amides such as N,N-dimethyl 9-decenamide and various other amides (not shown) are alternative to glycols such as BTG. Amides are highly stable toward base hydrolysis and capable of disrupting the H-bonding between emulsifier molecules, therefore may be acceptable alternatives to glycols as PPDs for amidoamines used in OBM.

A formulation using an amide (such as N,N-dimethyldodecanamide) was prepared and compared with a formulation containing BTG. For both formulations (not shown), the composition was 40 weight % resin, 13% PPD and 57% Synthetic B base oil. Experimental data indicated that formulations containing the new PPD and 40 weight % resin content are working.

It was also observed that a formulation containing 13% BTG showed a phase separation which was not observed for the formulation prepared using 16.7% BTG (as shown in Table 2). Without being bound by the theory, the inventors of the present application believe that BTG containing formulations have complicated phase diagrams which are sensitive to solid and PPD contents and therefore are undesirable from sustainability point. In contrast, formulations containing the present PPDs do not exhibit phase separation issues.

However, a content of 40% resin is considered too low from a practical point of view, as it is desired to prepare package formulations with about 60% active content and maintain the viscosity below 2500 cps at 77° F. (25° C.). This viscosity value is an empirical pourability measure.

Experimental results indicated several solvents that may serve as PPDs based on their solubility parameters, such as N,N-dimethyldodecanamide. Some of these compounds (such as N,N-dimethyldodecanamide) were used to prepare formulations having the following composition: 50% resin content, 8% SUREWET® and various amounts of PPD and Synthetic B base oil. SUREWET® is an additive that may function as a secondary emulsifier. The total active components content was 60% by weight. Table 5 below shows the formulations. In several cases, N,N-dimethyldodecanamide was blended with BTG to check for synergistic effects.

TABLE 5

Formulations of DETA-based amidoamine emulsifiers with various amounts of BTG and N,N-dimethyldodecanamide as PPD

| Formulation | Resin % | SUREWET® % | N,N-dimethyl-dodecanamide % | BTG % | Synthetic B % | Total % |
|---|---|---|---|---|---|---|
| EMP-001 | 50% | 8% | 0% | 0% | 42% | 100% |
| EMP-002 | 50% | 8% | 0% | 10% | 32% | 100% |
| EMP-003 | 50% | 8% | 5% | 5% | 32% | 100% |

TABLE 5-continued

Formulations of DETA-based amidoamine emulsifiers with various amounts of BTG and N,N-dimethyldodecanamide as PPD

| Formulation | Resin % | SUREWET ® % | N,N-dimethyl-dodecanamide % | BTG % | Synthetic B % | Total % |
|---|---|---|---|---|---|---|
| EMP-004 | 50% | 8% | 10% | 0% | 32% | 100% |
| EMP-005 | 50% | 8% | 10% | 5% | 27% | 100% |
| EMP-006 | 50% | 8% | 15% | 0% | 27% | 100% |
| EMP-007 | 50% | 8% | 20% | 0% | 22% | 100% |
| EMP-008 | 50% | 8% | 20% | 5% | 17% | 100% |

Figure 2:
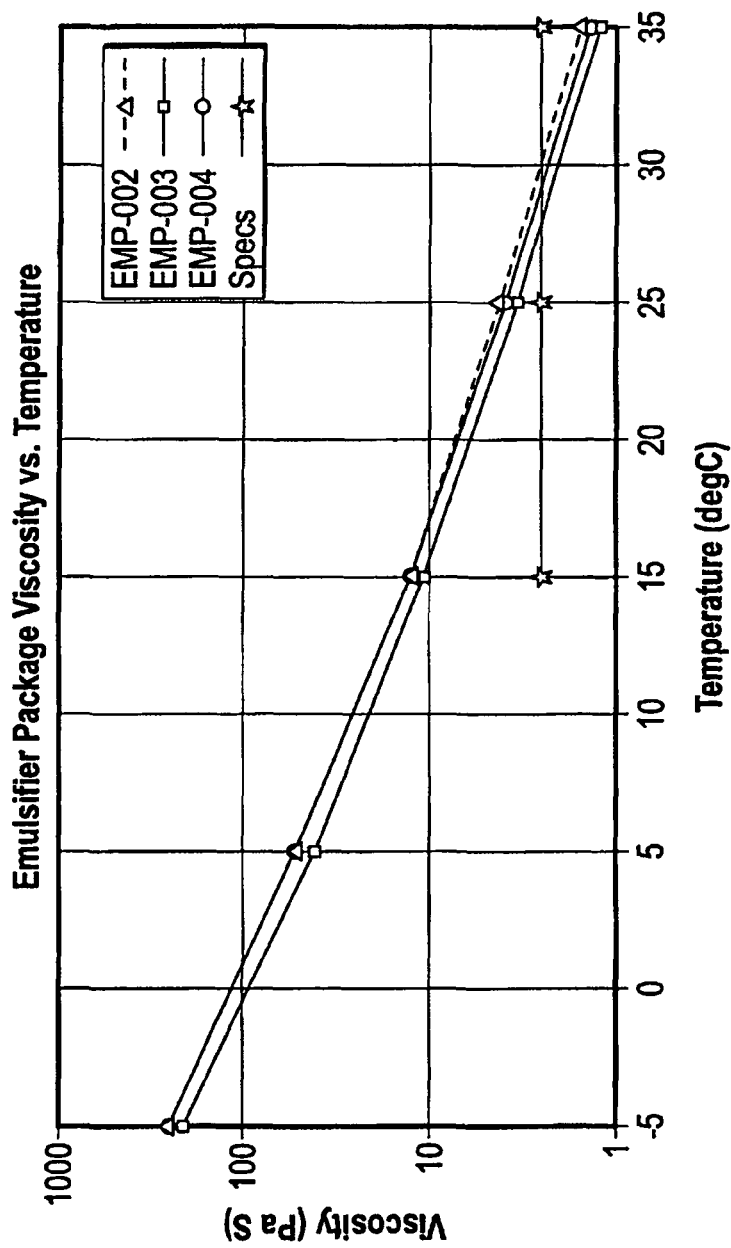

Viscosity versus temperature results of the formulations shown in Table 5 are depicted in FIG. 1. The horizontal line, as seen in FIG. 1, is at 2.5 Pa*s (2500 cP). EMP-001 is not shown in FIG. 1 because the sample was too viscous to be measured. A small synergistic effect between N,N-dimethyldodecanamide and BTG was observed. Specifically, as seen in Table 5 and FIG. 2, 10 wt % N,N-dimethyldodecanamide used as a PPD is not as effective as a blend of 5% of N,N-dimethyldodecanamide and 5% of BTG.

To fully assess the properties of the disclosed PPDs, their effect on OBMs was also studied. As shown in Tables 3 and 4, excess BTG may harm emulsion stability and mud properties, and may cause water in filtrate to appear. Table 6 below shows the effect these PPDs have on high temperature OBMs. Two PPDs were used at 2 different loading levels, namely 14% and 30%. Specifically, 14% means that PPD is present in a percentage of 14% by weight in the emulsifier formulation package, and 30% means that the emulsifier package contains 30 wt % of PPD. All formulations in Table 6 are adjusted to have an identical active resin (emulsifier) content. OBM was prepared in a standard manner and heat-aged for 16 hours at 350° F. (176.6° C.) under nitrogen pressure. Typical properties were measured. As shown by the experimental data, N,N-dimethyldodecanamide pour point depressant has less of a detrimental effect on OBM than BTG does and, therefore, may be used as an alternative to BTG.

As seen from the experimental data, N, N-dimethylamides may be used as effective pour point depressants. In addition, N,N-dimethyldodecanamide does not have a destabilizing effect on OBM at high temperature. Thus, N,N-dimethylamides, may act as effective PPDs for amidoamines emulsifiers at a comparable dosage versus BTG.

TABLE 6

Effect of various PPD loadings on high temperature OBMs.

| | DETA-based amidoamine emulsifier/N,N-dimethyldodecanamide at 14% | | | | DETA-based amidoamine emulsifier/N,N-dimethyldodecanamide at 30% | | | |
|---|---|---|---|---|---|---|---|---|
| Synthetic B | 152 | | | | 152 | | | |
| Organogel, g | 3 | | | | 3 | | | |
| Lime, g | 5 | | | | 5 | | | |
| Rheology modifier | 2 | | | | 2 | | | |
| Other rheology | 4 | | | | 4 | | | |
| Emulsifier, g | 15.6 | | | | 10.6 | | | |
| SUREWET ®, g | 0 | | | | 1 | | | |
| Ecotrol HT, g | 4 | | | | 4 | | | |
| 25% CaCl₂ brine, g | 65 | | | | 65 | | | |
| M-I WATE, g | 410 | | | | 410 | | | |
| Other additive | | | | | 3.75 | | | |
| | 150° F. | 40° F. | 100° F. | 150° F. | 150° F. | 40° F. | 100° F. | 150° F. |
| 600 rpm | 91 | 259 | 132 | 93 | 87 | 275 | 132 | 96 |
| 300 rpm | 58 | 149 | 72 | 56 | 53 | 159 | 77 | 60 |
| 200 rpm | 46 | 108 | 52 | 42 | 41 | 117 | 59 | 48 |
| 100 rpm | 33 | 62 | 35 | 29 | 28 | 70 | 38 | 34 |
| 6 rpm | 15 | 10 | 12 | 16 | 11 | 12 | 14 | 20 |
| 3 rpm | 14 | 8 | 11 | 16 | 11 | 9 | 14 | 21 |
| PV | 33 | 110 | 60 | 37 | 34 | 116 | 55 | 36 |
| YP | 25 | 39 | 12 | 19 | 19 | 43 | 22 | 24 |
| 10" gels | 19 | 9 | 18 | 23 | 14 | 9 | 20 | 27 |
| 10' gels | 26 | 31 | 31 | 29 | 27 | 31 | 38 | 28 |
| ES | 636 | | | 820 | 620 | | | 811 |
| HTHP at 350° F. (176.7° C.) | | | | 3.4 | | | | 7.2 |
| Water | | | | 0 | | | | trace |

The disclosed amides have a number of desirable properties that make them suitable to be used as PPDs, such as: 1) low viscosity fluid which helps with thinning out the blend by dilution; 2) capability for H-bonding which may disrupt the hydrogen bonding between the emulsifier molecules; 3) low reactivity (the amides are very unreactive towards hydrolysis in caustic OBM environment; unlike glycol PPDs, amides may not participate in reactions with the emulsifier during storage); 4) very low vapor pressures. In addition, the PPD quality is very consistent because it is formed by a well-controlled reaction unlike glycol PPDs which are prepared by ethylene oxide polymerization and, therefore, may have distribution in molecular weight.

Advantageously, embodiments of the present disclosure may provide emulsifier compositions that include an oleaginous base fluid, an emulsifier and a liquid tertiary amide as a pour point depressant. The use of the tertiary amide in the composition advantageously promotes H-bonding with emulsifiers, such as amidoamines, which disrupts the thickening intra-molecular H-bonding between emulsifier molecules, improving the stability of the emulsifier package and lowering the viscosity of the package for formulation in an OBM.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A composition, comprising:
    an oleaginous base fluid;
    an emulsifier; and
a liquid tertiary amide, wherein the liquid tertiary amide is selected from the group of cyclic or acyclic liquid tertiary amides.

2. The composition of claim 1, wherein the liquid tertiary amide has the formula $R_1$—CO—$NR_2R_3$, where $R_1$, $R_2$ and $R_3$ are the same or different.

3. The composition of claim 2, wherein any of the $R_1$, $R_2$ and $R_3$ groups of the liquid tertiary amide has at least 5 carbon atoms.

4. The composition of claim 3, wherein $R_1$ is selected from $C_5$-$C_{16}$ saturated and unsubstituted hydrocarbon chains.

5. The composition of claim 3, wherein $R_1$ is selected from $C_5$-$C_{20}$ unsaturated and branched hydrocarbon chains.

6. The composition of claim 3, wherein the liquid tertiary amide is selected from the group of N,N-dimethylamides.

7. The composition of claim 2, wherein $R_1$ and $R_2$ are connected or $R_2$ and $R_3$ are connected.

8. A composition, comprising:
    an oleaginous base fluid;
    an emulsifier; and
a liquid tertiary amide, wherein the liquid tertiary amide is a tetrasubstituted urea selected from the group of acyclic and cyclic tetrasubstituted ureas.

9. A method comprising:
    adding a composition to a wellbore fluid, the composition comprising an oleaginous base fluid;
        an emulsifier; and
        a liquid tertiary amide; and
    emplacing the wellbore fluid mixed with the composition into a wellbore,
    wherein the liquid tertiary amide is selected from the group of cyclic or acyclic liquid tertiary amides.

10. The method of claim 9, wherein the liquid tertiary amide has the formula $R_1$—CO—$NR_2R_3$, where $R_1$, $R_2$ and $R_3$ are the same or different.

11. The method of claim 10, wherein any of the $R_1$, $R_2$ and $R_3$ groups of the liquid tertiary amide has at least 5 carbon atoms.

12. The method of claim 10, wherein $R_1$ is selected from $C_5$-$C_{16}$ saturated and unsubstituted hydrocarbon chains.

13. The method of claim 10, wherein $R_1$ is selected from $C_5$-$C_{20}$ unsaturated and branched hydrocarbon chains.

14. The method of claim 10, wherein the liquid tertiary amide is selected from the group of N, N-dimethylamides.

15. The method of claim 10, wherein $R_1$ and $R_2$ are connected or $R_2$ and $R_3$ are connected.

16. A method comprising:
    adding a composition to a wellbore fluid, the composition comprising an oleaginous base fluid;
        an emulsifier; and
        a liquid tertiary amide; and
    emplacing the wellbore fluid mixed with the composition into a wellbore,
    wherein the liquid tertiary amide is a tetrasubstituted urea selected from the group of acyclic and cyclic tetrasubstituted ureas.

17. The method of claim 12, wherein the liquid tertiary amide is present in the composition in a proportion that ranges from 0 to 30% by weight, based on the weight of the emulsifier.

* * * * *